(12) United States Patent
Boscolo et al.

(10) Patent No.: US 12,475,496 B2
(45) Date of Patent: *Nov. 18, 2025

(54) SELECTING COLOR VALUES FOR AUGMENTED REALITY-BASED MAKEUP

(71) Applicant: Snap Inc., Santa Monica, CA (US)

(72) Inventors: Riccardo Boscolo, Culver City, CA (US); Jean Luo, Seattle, WA (US); Vincent Sung, Los Angeles, CA (US); Ibram Uppal, Woodland Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/749,168

(22) Filed: Jun. 20, 2024

(65) Prior Publication Data

US 2024/0338741 A1 Oct. 10, 2024

Related U.S. Application Data

(63) Continuation of application No. 17/394,095, filed on Aug. 4, 2021, now Pat. No. 12,062,078.
(Continued)

(51) Int. Cl.
  G06Q 30/0601 (2023.01)
  G06F 3/04845 (2022.01)
  (Continued)

(52) U.S. Cl.
  CPC ..... G06Q 30/0629 (2013.01); G06F 3/04845 (2013.01); G06F 3/04847 (2013.01);
  (Continued)

(58) Field of Classification Search
  None
  See application file for complete search history.

(56) References Cited

U.S. PATENT DOCUMENTS 5,615,347 A * 3/1997 Davis ............... G06F 3/04847
                                                 715/833
8,606,645 B1   12/2013 Applefeld
(Continued)

FOREIGN PATENT DOCUMENTS

CN   116324702 A   6/2023
CN   116324850 A   6/2023
(Continued)

OTHER PUBLICATIONS

"U.S. Appl. No. 17/394,064, Final Office Action mailed Feb. 27, 2023", 34 pgs.
(Continued)

*Primary Examiner* — Michael J Cobb
(74) *Attorney, Agent, or Firm* — Schwegman Lundberg & Woessner, P.A.

(57) ABSTRACT

Aspects of the present disclosure involve a system comprising a computer-readable storage medium storing a program and method for providing make-up based augmented reality content. The program and method provide for receiving a request to present augmented reality content in association with a captured image depicting a face of the user; accessing an augmented reality content item associated with applying makeup to the face and configured to generate a mesh for tracking plural regions of the face; receiving user input selecting a region; determining at least one of a range of color values or a range of contrast values relating to available makeup products for the selected region; and presenting an interface element in association with the face, the interface element for user selection of at least one of a color value within the range of color values or a contrast value within the range of contrast values.

11 Claims, 11 Drawing Sheets

Related U.S. Application Data

(60) Provisional application No. 63/198,078, filed on Sep. 28, 2020.

(51) Int. Cl.
*G06F 3/04847* (2022.01)
*G06F 3/04883* (2022.01)
*G06T 15/04* (2011.01)
*G06T 19/00* (2011.01)
*G06T 19/20* (2011.01)
*A45D 44/00* (2006.01)
*H04L 51/046* (2022.01)

(52) U.S. Cl.
CPC ..... *G06F 3/04883* (2013.01); *G06Q 30/0643* (2013.01); *G06T 15/04* (2013.01); *G06T 19/006* (2013.01); *G06T 19/20* (2013.01); *A45D 44/005* (2013.01); *H04L 51/046* (2013.01)

(56) References Cited

U.S. PATENT DOCUMENTS

| | | |
|---|---|---|
| 9,361,009 B2 | 6/2016 | Munter et al. |
| 10,296,958 B1 | 5/2019 | Tuan et al. |
| 10,373,348 B2 | 8/2019 | Sugaya |
| 10,740,974 B1 | 8/2020 | Cowburn et al. |
| 11,069,094 B1 | 7/2021 | Evangelista et al. |
| 11,409,402 B1 | 8/2022 | Cole et al. |
| 11,798,202 B2 | 10/2023 | Boscolo et al. |
| 2002/0024528 A1 | 2/2002 | Lambertsen |
| 2008/0204476 A1 | 8/2008 | Montague |
| 2010/0030578 A1 | 2/2010 | Siddique et al. |
| 2012/0036480 A1 | 2/2012 | Warner et al. |
| 2012/0223956 A1 | 9/2012 | Saito et al. |
| 2013/0066750 A1 | 3/2013 | Siddique et al. |
| 2013/0169827 A1 | 7/2013 | Santos et al. |
| 2013/0235067 A1* | 9/2013 | Cherna ............... G09G 5/026 345/594 |
| 2014/0006204 A1 | 1/2014 | Candrian et al. |
| 2014/0067624 A1 | 3/2014 | Babu |
| 2014/0122300 A1 | 5/2014 | Gonsalves et al. |
| 2015/0145882 A1 | 5/2015 | Nguyen et al. |
| 2016/0000209 A1 | 1/2016 | Yamanashi et al. |
| 2016/0125624 A1 | 5/2016 | Liu et al. |
| 2016/0196665 A1 | 7/2016 | Abreu et al. |
| 2016/0357578 A1 | 12/2016 | Kim et al. |
| 2016/0358505 A1 | 12/2016 | Isted et al. |
| 2017/0018024 A1 | 1/2017 | Xu et al. |
| 2017/0039988 A1 | 2/2017 | Whiting et al. |
| 2017/0060820 A1 | 3/2017 | Ficklin et al. |
| 2017/0109400 A1* | 4/2017 | Moore ................. G06F 16/26 |
| 2017/0176041 A1 | 6/2017 | Osaki et al. |
| 2017/0357320 A1 | 12/2017 | Chaudhri et al. |
| 2018/0075523 A1 | 3/2018 | Sartori Odizzio et al. |
| 2018/0075524 A1 | 3/2018 | Sartori Odizzio et al. |
| 2018/0131878 A1 | 5/2018 | Charlton et al. |
| 2018/0182145 A1 | 6/2018 | Imoto et al. |
| 2018/0268472 A1 | 9/2018 | Vilcovsky |
| 2018/0278879 A1 | 9/2018 | Saban et al. |
| 2019/0066348 A1 | 2/2019 | Jennings et al. |
| 2019/0108578 A1 | 4/2019 | Spivack et al. |
| 2019/0156522 A1 | 5/2019 | Sugaya |
| 2019/0179405 A1 | 6/2019 | Sun et al. |
| 2020/0022478 A1 | 1/2020 | Kelley et al. |
| 2020/0051298 A1 | 2/2020 | Nguyen et al. |
| 2020/0104020 A1 | 4/2020 | Grantham et al. |
| 2020/0143558 A1 | 5/2020 | Tran et al. |
| 2020/0342630 A1 | 10/2020 | Elmoznino et al. |
| 2021/0065285 A1 | 3/2021 | Goldberg et al. |
| 2021/0382564 A1 | 12/2021 | Blachly et al. |
| 2022/0101404 A1 | 3/2022 | Boscolo et al. |
| 2022/0101417 A1 | 3/2022 | Boscolo et al. |
| 2022/0101418 A1 | 3/2022 | Dehtiarov et al. |
| 2022/0101566 A1 | 3/2022 | Boscolo et al. |
| 2022/0202168 A1* | 6/2022 | Troutman ............. G06T 19/006 |
| 2022/0342443 A1 | 10/2022 | Sepulveda et al. |
| 2023/0302607 A1 | 9/2023 | Glesser et al. |
| 2024/0037809 A1 | 2/2024 | Boscolo et al. |

FOREIGN PATENT DOCUMENTS

| | | |
|---|---|---|
| CN | 116324898 A | 6/2023 |
| CN | 116529748 A | 8/2023 |
| EP | 3499447 A1 | 6/2019 |
| EP | 4109373 A1 | 12/2022 |
| WO | WO-2016054164 A1 | 4/2016 |
| WO | WO-2018085848 A1 | 5/2018 |
| WO | WO-2022066570 A1 | 3/2022 |
| WO | WO-2022066572 A1 | 3/2022 |
| WO | WO-2022066575 A1 | 3/2022 |
| WO | WO-2022067254 A1 | 3/2022 |

OTHER PUBLICATIONS

"U.S. Appl. No. 17/394,064, Non Final Office Action mailed Sep. 6, 2022", 30 pgs.
"U.S. Appl. No. 17/394,064, Notice of Allowance mailed Jun. 15, 2023", 8 pgs.
"U.S. Appl. No. 17/394,064, Response filed May 23, 2023 to Final Office Action mailed Feb. 27, 2023", 10 pgs.
"U.S. Appl. No. 17/394,064, Response filed Dec. 6, 2022 to Non Final Office Action mailed Sep. 6, 2022", 10 pgs.
"U.S. Appl. No. 17/394,064, Supplemental Notice of Allowability mailed Sep. 25, 2023", 2 pgs.
"U.S. Appl. No. 17/394,095, Non Final Office Action mailed Dec. 22, 2023", 18 pgs.
"U.S. Appl. No. 17/394,095, Notice of Allowance mailed Apr. 4, 2024", 9 pgs.
"U.S. Appl. No. 17/394,095, Response filed Mar. 8, 2024 to Non Final Office Action mailed Dec. 22, 2023", 8 pgs.
"U.S. Appl. No. 17/394,095, Supplemental Notice of Allowability mailed Apr. 15, 2024", 5 pgs.
"U.S. Appl. No. 17/476,065, Examiner Interview Summary mailed Jan. 19, 2023", 2 pgs.
"U.S. Appl. No. 17/476,065, Final Office Action mailed Apr. 4, 2024", 19 pgs.
"U.S. Appl. No. 17/476,065, Final Office Action mailed May 8, 2023", 12 pgs.
"U.S. Appl. No. 17/476,065, Non Final Office Action mailed Sep. 28, 2023", 12 pgs.
"U.S. Appl. No. 17/476,065, Non Final Office Action mailed Oct. 27, 2022", 13 pgs.
"U.S. Appl. No. 17/476,065, Response filed Jan. 11, 2023 to Non Final Office Action mailed Oct. 27, 2022", 12 pgs.
"U.S. Appl. No. 17/476,065, Response filed Jul. 6, 2023 to Final Office Action mailed May 8, 2023", 9 pgs.
"U.S. Appl. No. 17/476,065, Response filed Dec. 19, 2023 to Non Final Office Action mailed Sep. 28, 2023", 11 pgs.
"U.S. Appl. No. 17/488,011, Final Office Action mailed Dec. 19, 2023", 26 pgs.
"U.S. Appl. No. 17/488,011, Non Final Office Action mailed Apr. 9, 2024", 27 pgs.
"U.S. Appl. No. 17/488,011, Non Final Office Action mailed Sep. 12, 2023", 28 pgs.
"U.S. Appl. No. 17/488,011, Response filed Mar. 19, 2024 to Final Office Action mailed Dec. 19, 2023", 10 pgs.
"U.S. Appl. No. 17/488,011, Response filed Nov. 7, 2023 to Non Final Office Action mailed Sep. 12, 2023", 14 pgs.
"Chinese Application Serial No. 202180078071.1, Voluntary Amendment Filed Oct. 12, 2023".
"International Application Serial No. PCT/US2021/051075, International Preliminary Report on Patentability mailed Apr. 6, 2023", 8 pgs.
"International Application Serial No. PCT/US2021/051075, International Search Report mailed Jan. 4, 2022", 5 pgs.

(56) References Cited

OTHER PUBLICATIONS

"International Application Serial No. PCT/US2021/051075, Written Opinion mailed Jan. 4, 2022", 6 pgs.
"International Application Serial No. PCT/US2021/051086, International Preliminary Report on Patentability mailed Apr. 6, 2023", 8 pgs.
"International Application Serial No. PCT/US2021/051086, International Search Report mailed Jan. 11, 2022", 5 pgs.
"International Application Serial No. PCT/US2021/051086, Written Opinion mailed Jan. 11, 2022", 6 pgs.
"International Application Serial No. PCT/US2021/051099, International Preliminary Report on Patentability mailed Apr. 6, 2023", 10 pgs.
"International Application Serial No. PCT/US2021/051099, International Search Report mailed Jan. 12, 2022", 5 pgs.
"International Application Serial No. PCT/US2021/051099, Written Opinion mailed Jan. 12, 2022", 8 pgs.
"International Application Serial No. PCT/US2021/052417, International Preliminary Report on Patentability mailed Apr. 6, 2023", 7 pgs.
"International Application Serial No. PCT/US2021/052417, International Search Report mailed Jan. 20, 2022", 4 pgs.
"International Application Serial No. PCT/US2021/052417, Written Opinion mailed Jan. 20, 2022", 5 pgs.
Wang, Shuo, et al., "Designing a generalized 3D carousel view", CHI'05 Extended Abstracts on Human Factors in Computing Systems, ACM, NY, USA, (Apr. 2, 2005), 2017-2020.
West, Presley, "Sephora's AR App Update Lets You Try Virtual Makeup On At Home", VR Scout, [Online] Retrieved from the Internet: <URL:https://vrscout.com/news/sephoras-ar-app-update-virtual-makeup-on/>, [Retrieved on Mar. 12, 2019], (Mar. 22, 2017), 8 pgs.
Yaoyuneyong, G S, et al., "Virtual dressing room media, buying intention and mediation", Journal of Research in Interactive Marketing, 12(1), [Online] Retrieved from the internet: <http://dx.doi.org/10.1108/JRIM-06-2017-0042>, (2018), 125-144.
Zhang, Y Fiore, et al., "Impact of website design features on experiential value and patronage intention toward online mass customization sites", Journal of Fashion Marketing and Management 25, (2021), 205-223.
"U.S. Appl. No. 17/476,065, Final Office Action mailed May 13, 2025", 17 pgs.
"Korean Application Serial No. 10-2023-7014048, Notice of Preliminary Rejection mailed Jun. 4, 2025", w/ English Translation, 12 pgs.
"Korean Application Serial No. 10-2023-7014484, Response Filed Apr. 11, 2025 to Notice of Preliminary Rejection mailed Feb. 11, 2025", w/ English Claims, 36 pgs.
"U.S. Appl. No. 17/476,065, Examiner Interview Summary mailed Jan. 17, 2025", 2 pgs.
"U.S. Appl. No. 17/476,065, Examiner Interview Summary mailed Oct. 9, 2024", 2 pgs.
"U.S. Appl. No. 17/476,065, Non Final Office Action mailed Oct. 1, 2024", 20 pgs.
"U.S. Appl. No. 17/476,065, Response filed Jul. 3, 2024 to Final Office Action mailed Apr. 4, 2024", 12 pgs.
"U.S. Appl. No. 17/476,065, Response filed Dec. 30, 2024 to Non Final Office Action mailed Oct. 1, 2024", 11 pgs.
"U.S. Appl. No. 17/488,011, Corrected Notice of Allowability mailed Apr. 4, 2025", 1 pg.
"U.S. Appl. No. 17/488,011, Corrected Notice of Allowability mailed Apr. 21, 2025", 2 pgs.
"U.S. Appl. No. 17/488,011, Final Office Action mailed Oct. 23, 2024", 30 pgs.
"U.S. Appl. No. 17/488,011, Notice of Allowance mailed Jan. 14, 2025", 15 pgs.
"U.S. Appl. No. 17/488,011, Notice of Allowance mailed Mar. 14, 2025", 9 pgs.
"U.S. Appl. No. 17/488,011, Response filed Jul. 9, 2024 to Non Final Office Action mailed Apr. 9, 2024", 11 pgs.
"U.S. Appl. No. 17/488,011, Response filed Dec. 17, 2024 to Final Office Action mailed Oct. 23, 2024", 10 pgs.
"U.S. Appl. No. 18/485,996, Non Final Office Action mailed Nov. 21, 2024", 29 pgs.
"U.S. Appl. No. 18/485,996, Notice of Allowance mailed Mar. 21, 2025", 8 pgs.
"U.S. Appl. No. 18/485,996, Response filed Feb. 21, 2025 to Non Final Office Action mailed Nov. 21, 2024", 10 pgs.
"European Application Serial No. 21790730.2, Communication Pursuant to Article 94(3) EPC mailed Sep. 26, 2024", 6 pgs.
"European Application Serial No. 21790730.2, Response Filed Jan. 23, 2025 to Communication Pursuant to Article 94(3) EPC mailed Sep. 26, 2024", 9 pgs.
"European Application Serial No. 21790730.2, Response to Communication Pursuant to Rules 161 and 162 EPC Filed Nov. 14, 2023", 19 pgs.
"European Application Serial No. 21798496.2 , Response to Communication Pursuant to Rules 161 and 162 EPC Filed Nov. 9, 2023", 16 pgs.
"European Application Serial No. 21798496.2, Communication Pursuant to Article 94(3) EPC mailed Feb. 27, 2025", 7 pgs.
"Korean Application Serial No. 10-2023-7013655, Notice of Preliminary Rejection mailed Feb. 10, 2025", w/ English translation, 14 pgs.
"Korean Application Serial No. 10-2023-7013655, Response filed Apr. 10, 2025 to Notice of Preliminary Rejection mailed Feb. 10, 2025", W/English Claims, 33 pgs.
"Korean Application Serial No. 10-2023-7014004, Notice of Preliminary Rejection mailed Feb. 10, 2025", w/ English Translation, 8 pgs.
"Korean Application Serial No. 10-2023-7014004, Response filed Apr. 8, 2025 to Notice of Preliminary Rejection mailed Feb. 10, 2025", W/English Claims, 26 pgs.
"Korean Application Serial No. 10-2023-7014484, Notice of Preliminary Rejection mailed Feb. 11, 2025", w/ English translation, 12 pgs.
West, Presley, "Sephora s AR App Update Lets You Try Virtual Makeup On At Home—VRScout", XP055568002, [Online]. Retrieved from the Internet: <URL: https://vrscout.com/news/sephoras-ar-app-update-virtual-makeup-on/>, (Mar. 22, 2017), 11 pgs.

* cited by examiner

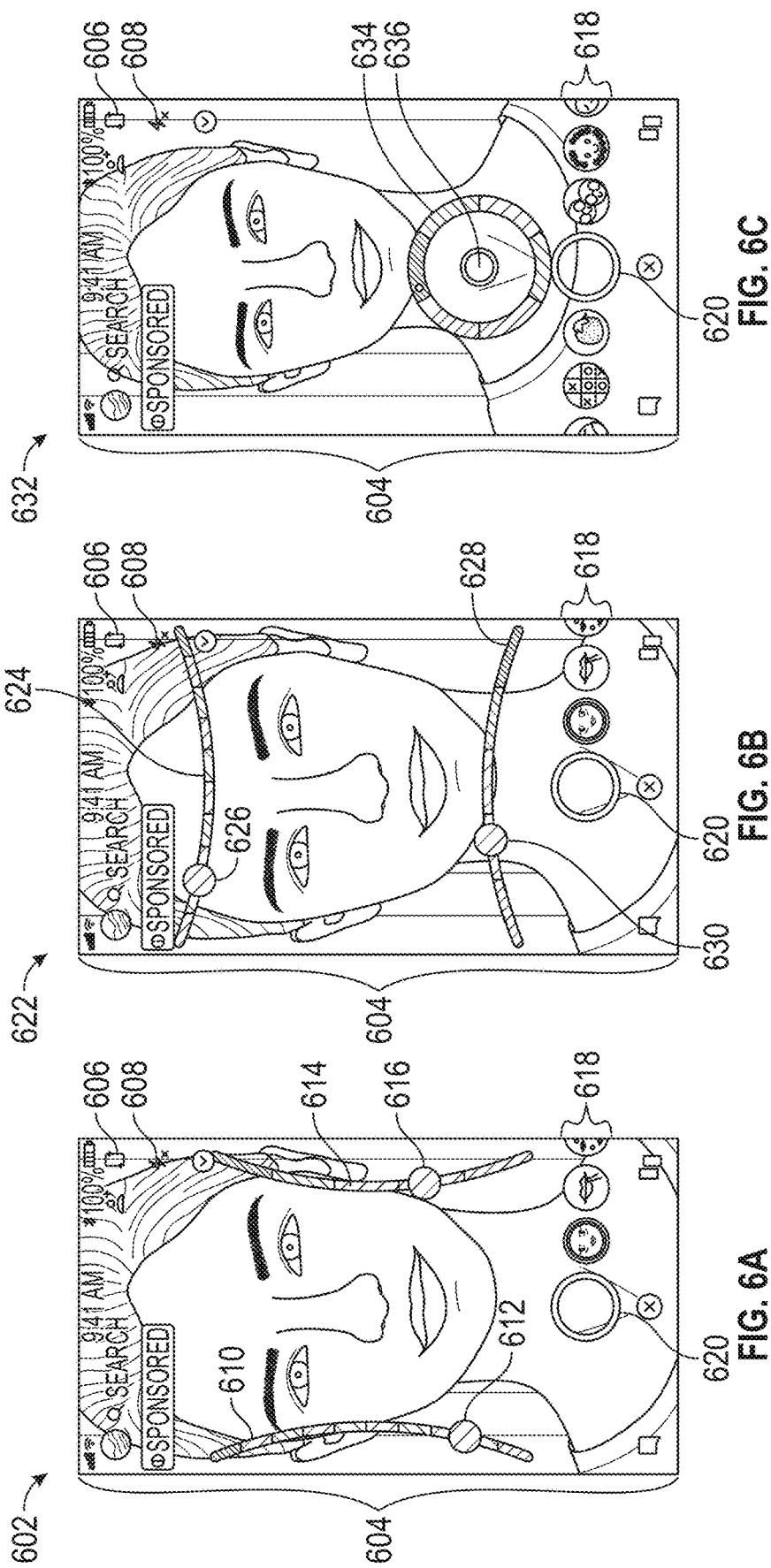

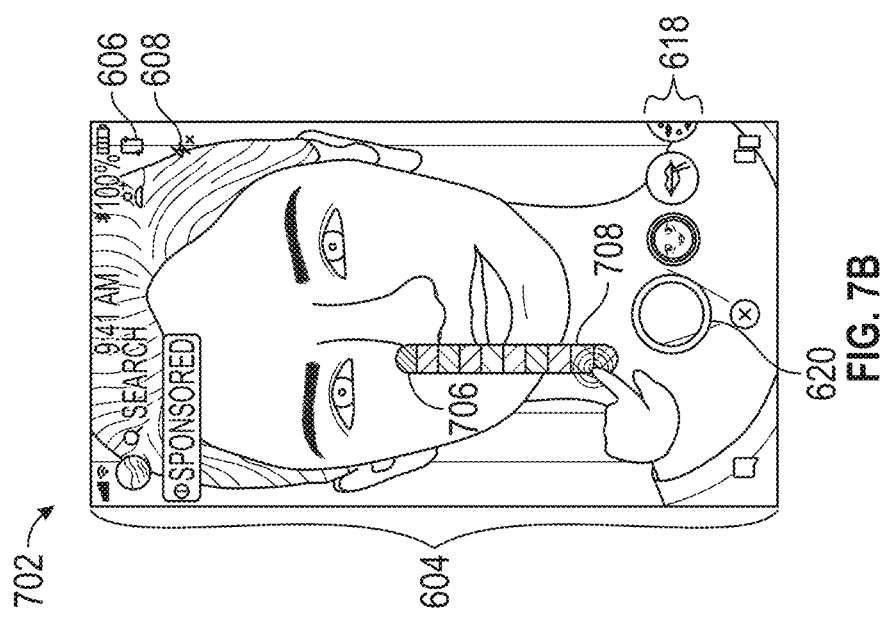
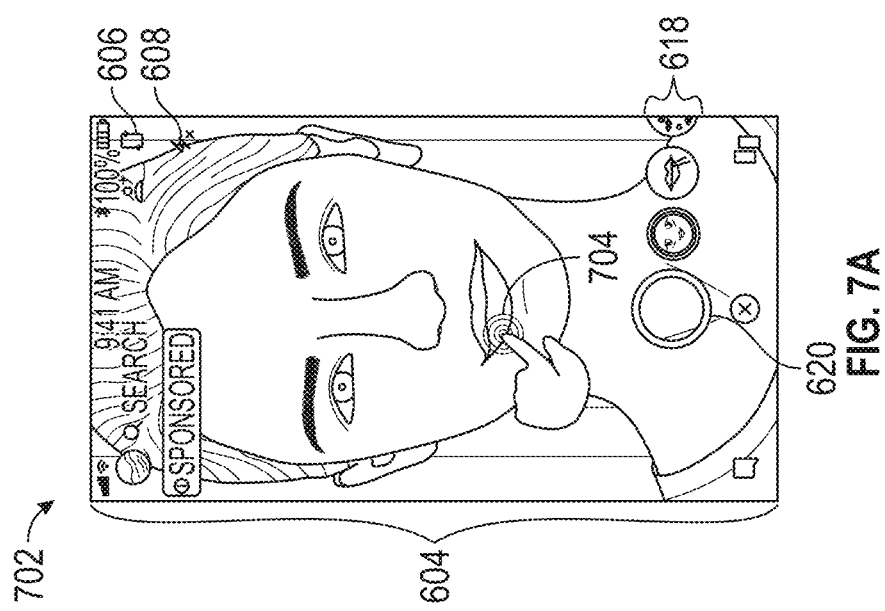

SELECTING COLOR VALUES FOR AUGMENTED REALITY-BASED MAKEUP

CROSS-REFERENCE TO RELATED APPLICATION

This patent application is a continuation of U.S. patent application Ser. No. 17/394,095, filed Aug. 4, 2021, which application claims the benefit of U.S. Provisional Patent Application No. 63/198,078, filed Sep. 28, 2020, entitled "SELECTING COLOR VALUES FOR AUGMENTED REALITY-BASED MAKEUP", which are incorporated by reference herein in their entireties.

TECHNICAL FIELD

The present disclosure relates generally to a messaging system, including providing augmented reality content with a captured image.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 6A illustrates an example user interface with interface elements for selecting makeup color and contrast, in accordance with some example embodiments.

FIG. 6B illustrates another example user interface with interface elements for selecting makeup color and contrast, in accordance with some example embodiments.

FIG. 6C illustrates another example user interface with interface elements for selecting makeup color and contrast, in accordance with some example embodiments.

FIG. 7A illustrates an example user interface in which a user provides touch input for changing makeup color, in accordance with some example embodiments.

FIG. 7B illustrates an example user interface for changing makeup color, in accordance with some example embodiments.

DETAILED DESCRIPTION

A messaging system typically allow users to exchange content items (e.g., messages, images and/or video) with one another in a message thread. A messaging system may implement or otherwise work in conjunction with a shopping system for the on-line purchase of goods and/or services.

The disclosed embodiments provide for a messaging client to present augmented reality content for trying on makeup products. The messaging client activates or otherwise accesses an augmented reality content item (e.g., corresponding to a Lens or augmented reality experience) which generates a mesh for tracking regions of a face depicted in a captured image. The augmented reality content item provides for a user to select a region of the face, and depicts ranges for color and contrast corresponding to makeup that can be applied to the selected region. A user may select a particular color and/or contrast within the depicted ranges, and the messaging client presents simulated makeup as an overlay on the facial region. In addition, makeup product(s) matching the selected color and/or contrast may be presented with shopping cart interface element(s) for adding to the user's shopping cart for eventual purchase.

Figure 1:
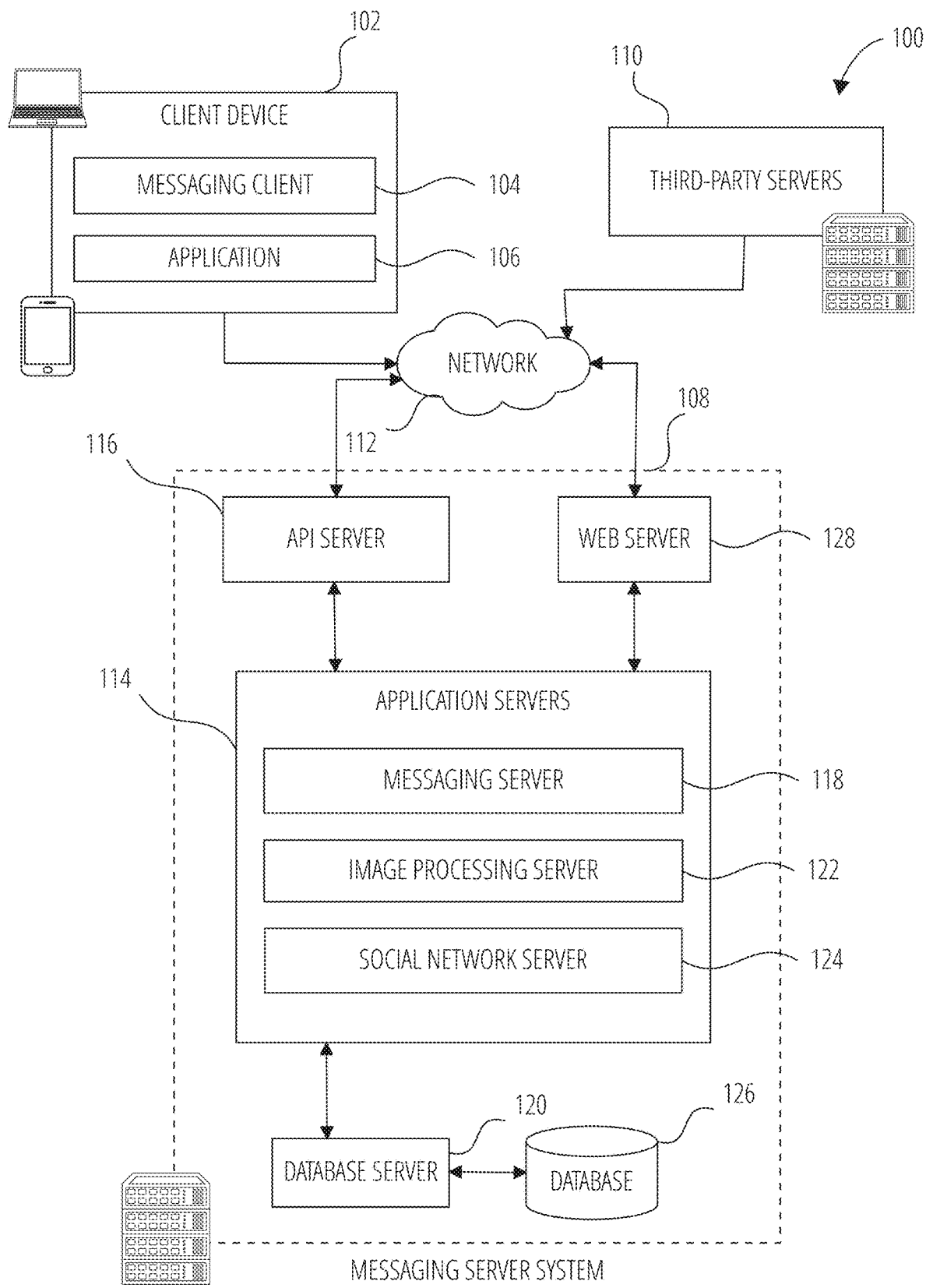
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
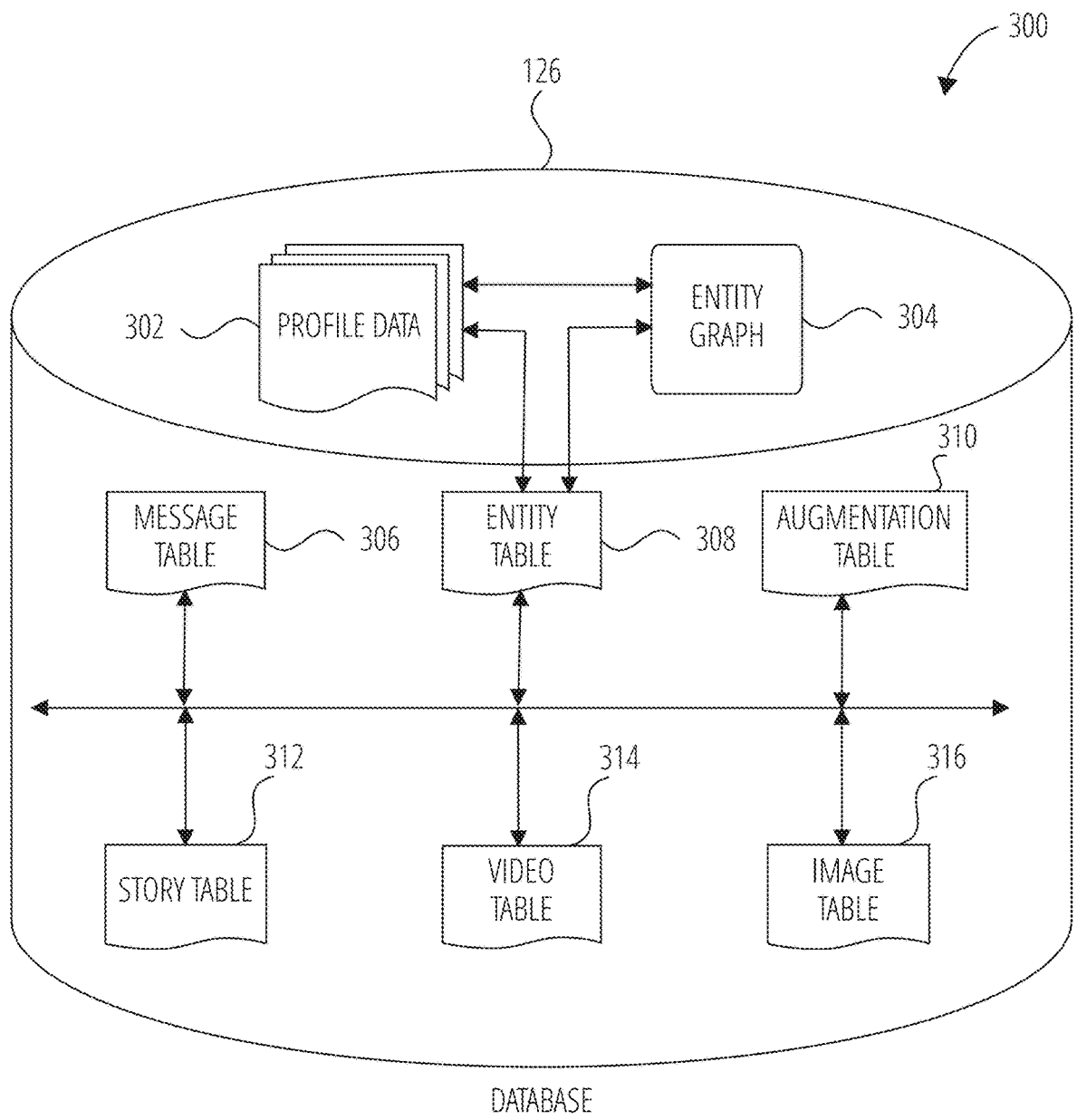
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 304 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2:
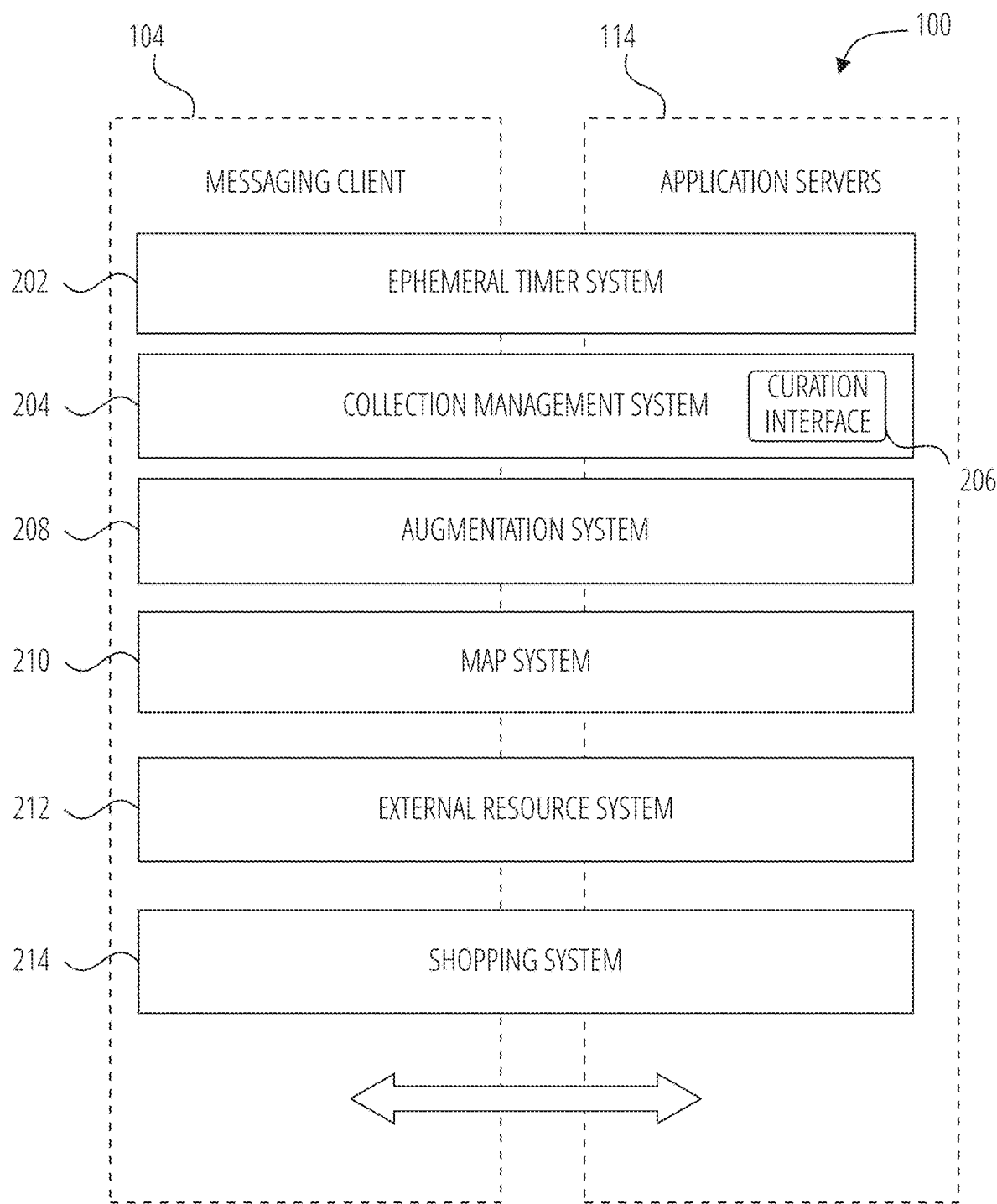
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, an external resource system 212, and a shopping system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

In other examples, as discussed below with respect to FIG. 3, the augmentation system 208 provides for presenting augmented reality content in association with an image or a video captured by a camera of the client device 102. The augmentation system 208 may implement or otherwise access augmented reality content items (e.g., corresponding to applying Lenses or augmented reality experiences) for providing real-time special effect(s) and/or sound(s) that may be added to the image or video. To facilitate the presentation of augmented reality content, the augmentation system 208 may implement or otherwise access object recognition algorithms (e.g., including machine learning algorithms) configured to scan an image or video, and to detect/track the movement of objects within the image or video.

The map system 210 provides various geographic location functions, and supports the presentation of map-based media content and messages by the messaging client 104. For example, the map system 210 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The external resource system 212 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The shopping system 214 provides various shopping-related functions within the context of the messaging system 100. Examples of shopping-related functions include, but are not limited to, allowing a user to: browse a range of items (e.g., products and/or services), view images and/or videos of the items, view information about item specifications, features and prices, maintain a shopping cart for selecting items for eventual purchase, and/or purchase selected items. In one or more embodiments, the shopping system 214 works in conjunction with third party services (e.g., the external resource system 212) in order to perform one or more of the shopping-related functions with respect to the messaging system 100. Moreover, the augmentation system 208 may work in conjunction with the shopping system 214, in order to modify the captured image or video to include shopping information (e.g., via overlays, augmented reality content, etc.).

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 306. This message data includes, for any particular one message, at least message sender data, message recipient (or receiver) data, and a payload. Further details regarding information that may be included in a message, and included within the message data stored in the message table 306 is described below with reference to FIG. 4.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization) interested-based or activity-based, merely for example.

The profile data 302 stores multiple types of profile data about a particular entity. The profile data 302 may be selectively used and presented to other users of the messaging system 100, based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may provide a real-time special effect and/or sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 306. Similarly, the image table 316 stores image data associated with messages for which message data is stored in the entity table 308. The entity table 308 may associate various augmentations from the augmentation table 310 with various images and videos stored in the image table 316 and the video table 314.

Figure 4:
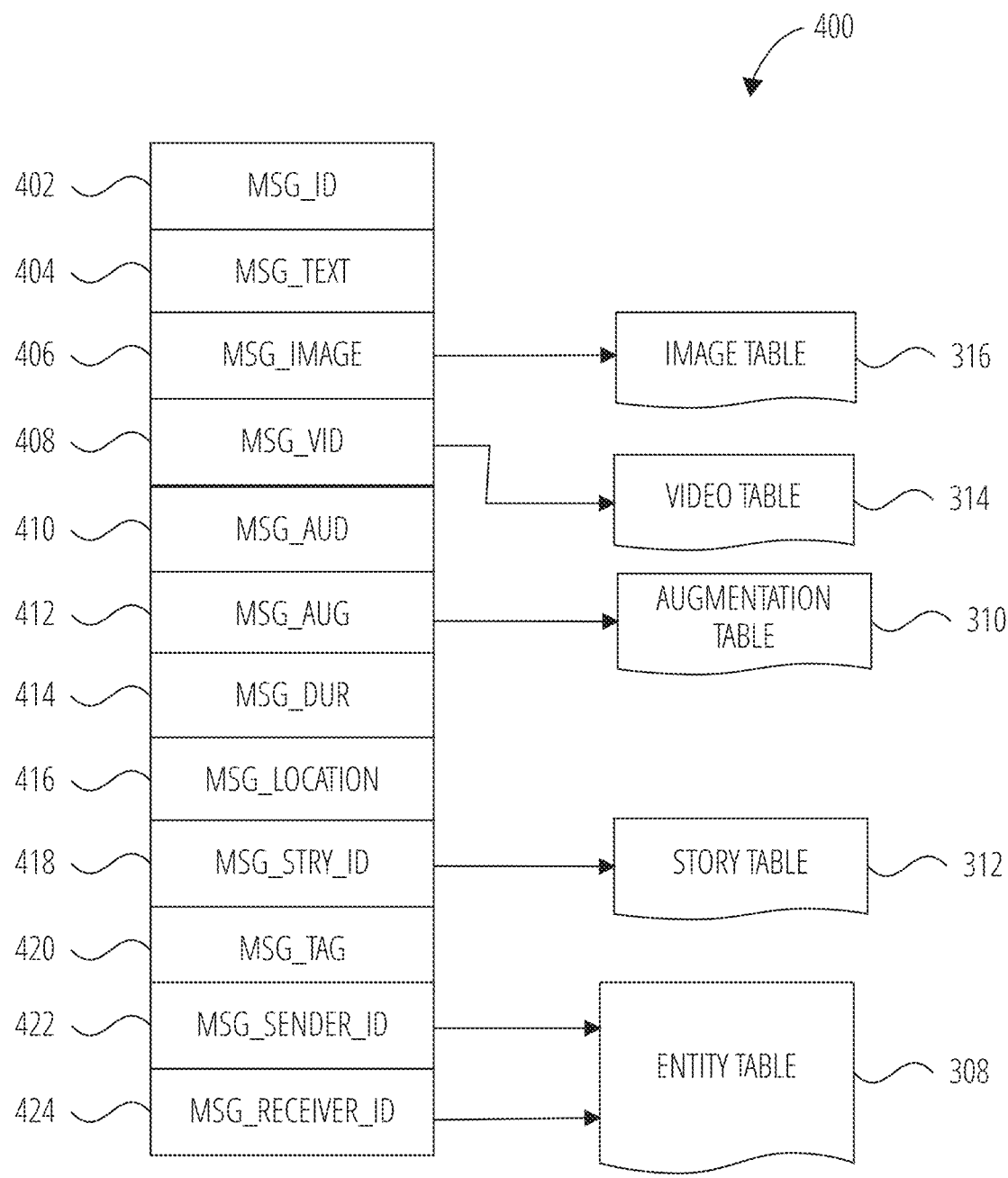
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 306 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 308.

Figure 5:
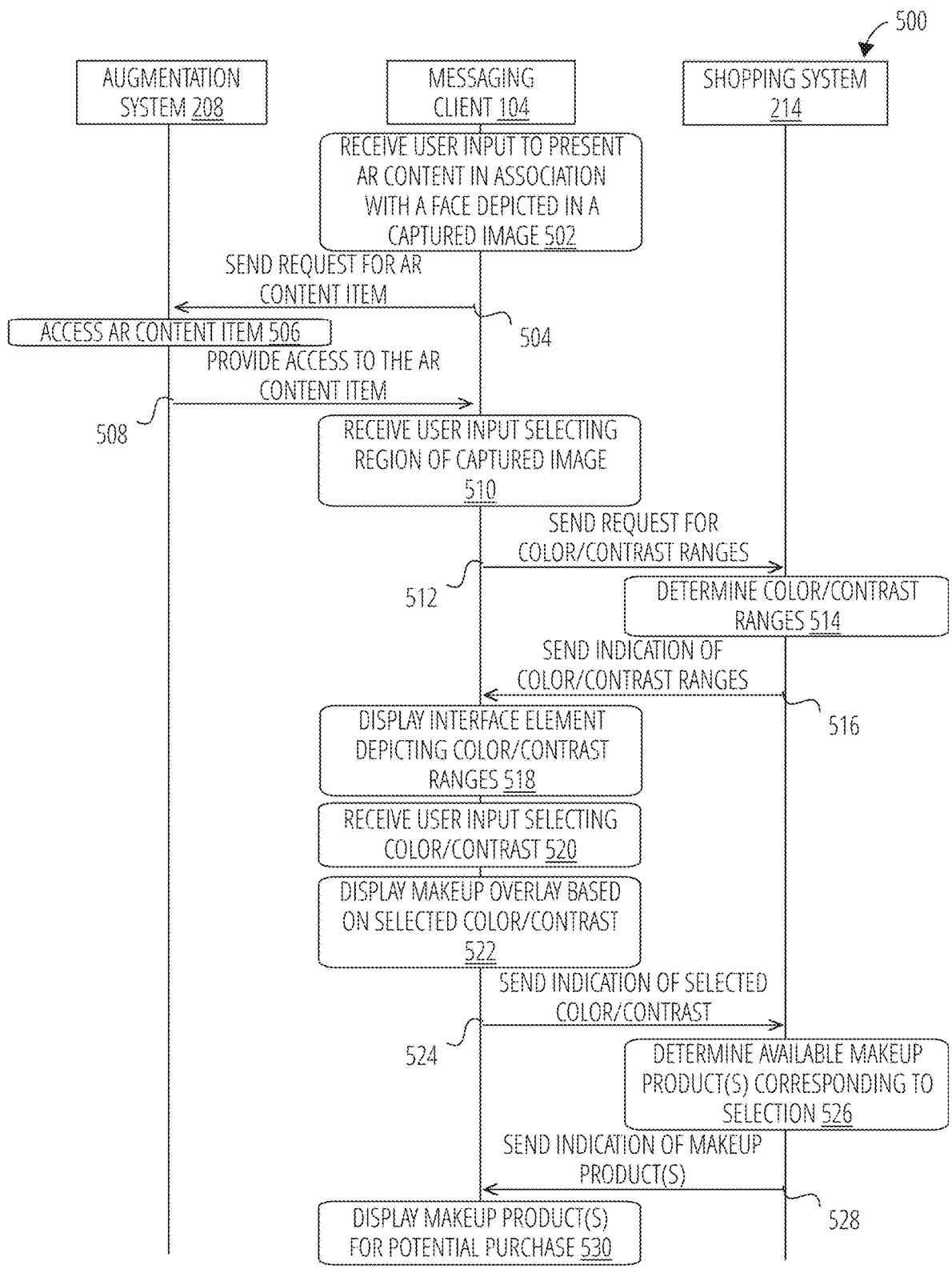
FIG. 5 is an interaction diagram illustrating a process for providing augmented reality-based makeup in a messaging system, in accordance with some example embodiments.

FIG. 5 is an interaction diagram illustrating a process 500 for providing augmented reality-based makeup in a messaging system, in accordance with some example embodiments. For explanatory purposes, the process 500 is primarily described herein with reference to the messaging client 104 of FIG. 1, the augmentation system 208 and the shopping system 214 of FIG. 2. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

The messaging client 104 may be associated with a respective user of the messaging server system 108, and the user may be associated with a user account of the messaging server system 108. As noted above, the user may be identified by the messaging server system 108 based on a unique identifier (e.g., a messaging system identifier, email address and/or a device identifier) associated with the user account for that user. In addition, the messaging server system 108 may implement and/or work in conjunction with the social network server 124 which is configured to identify other users (e.g., friends) with which a particular user has relationships.

As described herein, the messaging client 104 (e.g., in conjunction with the messaging server system 108) presents augmented reality content for trying on makeup products. The messaging client 104 activates or otherwise accesses an augmented reality content item, which generates a mesh for tracking regions of a face depicted in a captured image (e.g., a real-time video feed). The augmented reality content item provides for a user to select a region of the face, and to depict color/contrast ranges for makeup that can be applied to the selected region. The user selects a particular color and/or contrast, and corresponding makeup is presented as an overlay on the facial region. In addition, makeup product(s) matching the selected color and/or contrast may be presented with shopping cart interface element(s) for adding to the user's shopping cart for eventual purchase.

In one or more embodiments, the messaging client 104 activates a camera of the client device 102, for example, at startup of the messaging client 104 to capture an image depicting a face. For example, the camera may correspond to a front-facing camera for capturing an image which depicts the user's face, or to a rear-facing camera for capturing an image of another individual's face. Alternatively or in addition, the image may correspond to an image (e.g., photo) stored in association with the user of the client device 102 (e.g., a photo library).

At block 502, the messaging client 104 receives user input to present augmented reality content in association with the face depicted in the captured image. As noted above, the augmentation system 208 may implement or otherwise access augmented reality content items. The augmentation system 208 may correspond to a subsystem of the messaging system 100, and may be supported on the client side by the messaging client 104 and/or on the server side by the application servers 114. Thus, the providing of augmented reality content items may be implemented client side, server side and/or a combination of client side and server side.

In conjunction with the augmentation system 208, the messaging client 104 may provide a carousel interface which allows the user to cycle through and/or select among different augmented reality content items to apply/display with respect to an image captured by the camera. Each of the available augmented reality content items is represented by an icon which is user-selectable for switching to the respective augmented reality content item.

Thus, the user input corresponding to block 502 may correspond with the user selecting an augmented reality content item from among the plural augmented reality content items presented within the carousel interface. For example, the selected augmented reality content item provides augmented reality content that simulates the application of makeup. The messaging client 104 sends, to the augmentation system 208, a request for the selected augmented reality content item (operation 504).

In response, the augmentation system 208 accesses the selected augmented reality content item (block 506), and provides the messaging client 104 with access to the augmented reality content item (operation 508). For example, the augmentation system 208 provides the messaging client 104 with appropriate code and/or application interfaces for presenting the augmented reality content item within the messaging client 104.

As noted above, the augmented reality content item provides augmented reality content that simulates application of makeup with respect to a face depicted in a captured image (e.g., from a real-time video feed, or an image/video stored in a photo library). The augmented reality content item is configured to detect when different facial regions are present in a captured image, and to generate a mesh based on characteristic points of the regions of the face. Using the example of makeup, regions of the face include, but are not limited to the user's eyebrows, eyes, cheekbone high point, cheekbone underside and/or lips. The generated mesh may be used for tracking these regions of the face in a video stream (e.g., by aligning mesh regions with respective regions of the face), in order to augment/transform display of the region(s) of the face as captured by the device camera. The detecting and/or tracking of the regions of the face, including the generation and use of the mesh, may be based on machine learning algorithms.

The messaging client 104 is configured to present the augmented reality content item, including the mesh, in association with the captured image. In one or more embodiments, presenting the augmented reality content item corresponds with employing the mesh to track regions of a depicted face but without displaying overlays (e.g., outlined areas) for each region. Alternatively, the augmented reality content item may provide for displaying an overlay for one or more regions (e.g., an outline corresponding to the periphery of the region) to facilitate user selection of region(s).

Thus, at block 510, the messaging client 104 receives user input indicating a region of the captured image. For example, the user may select the region corresponding to the user's eye, eyebrow, cheekbone high point, cheekbone underside and/or lips. User selection of a region may correspond with a user request to be presented with available color/contrast options (e.g., ranges) for the selected region.

The messaging client 104 sends, to the shopping system 214, a request for color/contrast ranges for makeup corresponding to the selected region (operation 512). For example, the request may be for a range of color values and a range of contrast values relating to available makeup products for the selected region. In one or more embodiments, the request indicates the selected region of the face (e.g., in the form of a keyword such as "eye," "eyebrow," "cheekbone high point," "cheekbone underside," "lips" or via other known techniques for identifying regions of an image/face).

The shopping system 214 determines the color/contrast ranges based on the selected region of the face (block 514). As noted above, the shopping system 214 may correspond to a subsystem of the messaging system 100, and may be supported on the client side by the messaging client 104 and/or on the server side by the application servers 114. In one or more embodiments, functions performed by the shopping system 214 may be implemented client side, server side and/or a combination of client side and server side. With respect to available color/contrast ranges, the shopping system 214 may access (e.g., from a data store) predetermined ranges of color values and/or contrast values with respect to each of the facial regions. The ranges for color/contrast values may be based on available makeup products that are accessible by the shopping system 214. The determination of color-contrast values may be based on other signals and/or parameters as discussed below with respect to block 526.

At operation 516, the shopping system 214 sends an indication of the color/contrast ranges to the messaging client 104. For example, the shopping system 214 may define the ranges for color/contrast based on one or more of an RGB (red, green blue) color model, an HSL (hue, saturation, lightness) color model and/or an HSV (hue, saturation, value) color model. The messaging client 104 is configured to receive the values for defining the color/contrast ranges, and for displaying corresponding interface elements that depict the color/contrast ranges.

Thus, the messaging client 104 displays interface element(s) depicting the color/contrast ranges (block 518). In one or more embodiments, the messaging client 104 displays a first arc-shaped bar which depicts the range of color values for user selection of a particular color. The messaging client 104 further displays a second arc-shaped bar which depicts the range of contrast values (e.g., based on a selected color) for user selection of a particular contrast. For example, after user selection of a color value, the range of contrast values may be determined and displayed with respect to the selected color value.

As discussed below regarding the example of FIG. 6A, the messaging client 104 displays the first and second arc-shaped bars on left and right sides of the screen, while continuing to display the captured image depicting the user's face. In another example corresponding to FIG. 6B, the messaging client 104 displays the first and second arc-shaped bars at top and bottom parts of the screen, while continuing to display the captured image depicting the user's face.

In another example, as discussed below with respect to FIG. 6C, the interface element for color/contrast selection is presented as a circle. The periphery of the circle depicts the range of color values for user selection of a particular color. User selection of the contrast value may be based on a distance of touch input relative to a center of the circle (e.g., with lower contrast for touch input at the periphery, and increasing contrast as the touch input approaches the center of the circle).

At block 520, the messaging client 104 receives user input selecting a color value within the range of color values and a contrast value within the range of contrast values. The messaging client 104 then displays an overlay corresponding to makeup based on the user-selected color value and contrast value (block 522). For example, the augmented reality content item is configured to present simulated makeup corresponding to the selected color/contrast values at the selected facial region. In this manner, the augmented reality content item appears to apply makeup to the user's face depicted in the image in real-time.

In addition to simulating application of a makeup color and contrast, the messaging client 104 may provide for displaying available makeup product(s) corresponding to the selected color/contrast. Thus, at operation 524, the messaging clients 104 sends a request for available makeup product(s) based on the user-selected color value and contrast value. In one or more embodiments, the request indicates the color/contrast values, and indicates the selected region of the face (e.g., via keyword as discussed above).

Moreover, the request may include further information, such as a user identifier (e.g., a messaging system identifier, email address and/or a device identifier) and/or facial feature data. For example, the messaging client 104 in conjunction with the augmentation system 208 may determine the facial feature data (e.g., size, shape and/or position of the individual regions of the face or of the face as a whole) based on dimensions and/or measurements from the mesh.

As noted above, the shopping system 214 (e.g., in conjunction with third party services such as the external resource system 212) allows the user to browse a range of products, view images and/or videos of the products, view information about product specifications, features and prices, maintain a shopping cart for selecting products for eventual purchase, and/or purchase selected products. At block 526, the shopping system 214 determines available makeup product(s) based on the request provided at operation 524. The shopping system 214 may base such determination on one or more of the selected color/contrast values, the selected regions of the face (e.g., via keywords), the user identifier and/or the facial data provided with the request.

For example, the shopping system 214 may determine the set of available makeup products based on ranking one or more of the following signals and/or parameters: predefined makeup collections associated with the selected region of the face; user history indicating preferences (e.g., prior purchases associated with the user identifier and relating to makeup color, contrast, brand name, etc.); user activity (e.g., activity associated with the user identifier and relating to workout vs. non-workout makeup); time of year (e.g., with different seasons being associated with different makeup collections); user-submitted responses to a questionnaire; makeup trending data; sponsored keywords; and/or makeup products sets associated with predefined entities.

With respect to user-submitted responses to a questionnaire, the messaging client 104 in conjunction with the augmented reality content item may present the questionnaire to the user. For example, the questionnaire may be a user-selectable option (e.g., presented when the augmented reality content item is launched) with predefined questions. The questions may relate to one or more of makeup goals, an ideal look, areas of interest, makeup sensitivities (e.g., allergies) and/or preferred color/intensity. In a case where the user opts for the questionnaire, the messaging client 104 may send an indication of the user-submitted responses to the shopping system 214, as a parameter for determining (e.g., ranking) available makeup products.

Regarding sponsorships, the shopping system 214 may provide for the sponsorship of keywords by a third party (e.g., makeup manufacturer corresponding to a brand name). For example, the third party may sponsor one or more keywords relating to regions of a face (e.g., "eye," "eyebrow," "cheekbone high point," "cheekbone underside," "lips") and/or corresponding makeup (e.g., "eye makeup," "mascara," "eye shadow," "lipstick" and the like). In response to determining that the selected region of the face corresponds to a sponsored keyword, the shopping system 214 may provide for a higher ranking of makeup products from the third party relative to other makeup products.

With respect to makeup product sets associated with predefined entities, the predefined entities may correspond to corporate entities, social media influencers, celebrities, and the like. For example, a corporate entity via the external resource system 212 may associate selected makeup products/sets with respective facial features (e.g., size, shape and/or position of the individual regions of the face or of the face as a whole). In another example, a social media influencer may recommend or otherwise be associated with selected makeup products/sets.

The shopping system 214 may be configured to access a database (e.g., database 126) storing information for a predefined set of entities (e.g., corporations, social media influencers). For example, each entity authorizes the storing of the information within the database 126, where the information includes facial feature data and makeup product(s)/set(s) for the entity. Based on the facial feature data of the user as provided in the request of operation 512, the shopping system 214 may select an entity with facial feature data that corresponds to the face of the user (e.g., based on meeting threshold values with respect to matching face size, shape, dimensions, etc.).

Thus, after ranking makeup products based on the above-mentioned signals and/or parameters, the shopping system 214 selects available makeup product(s) corresponding to the user-selected color/contrast and facial region. The shopping system 214 sends an indication of the available makeup product(s) to the messaging client 104 (operation 528). In one more embodiments, the above-mentioned signals and/or parameters may be used in determining (e.g., based on ranking) the color/contrast ranges described above with respect to block 514.

The messaging client 104 displays the makeup products for potential purchase by the user (block 530). For example, the messaging client 104 may provide interface elements for the user to select one or more of the available makeup products for adding to a shopping cart associated with a user account of the user. In response, the messaging client 104 sends an indication of the selected makeup product(s) to the shopping system 214, which in turn adds the selected one or more makeup product(s) to the shopping cart. As noted above, the shopping cart may be implemented by the shopping system 214, in order to allow users to select items for eventual purchase in association with their user account.

FIGS. 6A-6C and 7A-7B illustrate user interfaces for displaying augmented reality content corresponding to makeup. For example, the user interfaces may be presented in response to user selection of the augmented reality content item for applying makeup as described above. As noted above, the augmentation system 208 may provide the messaging client 104 with access to such augmented reality content item.

FIG. 6A illustrates an example user interface 602 with interface elements for selecting makeup color and contrast, in accordance with some example embodiments. The user interface 602 displays a captured image 604 corresponding to a user's face. The user interface 622 further includes a camera selection button 606, a flash button 608, a color selector 610, a contrast selector 614, and a carousel interface 618 with a selected AR icon 620.

The captured image 604 may correspond to a live video feed captured by a camera of the client device 102. Alternatively or in addition, the image may correspond to an image (e.g., photo) stored in association with the user of the client device 102 (e.g., a photo library).

While the example of FIG. 6A illustrates the captured image 604 as captured by a front-facing camera of the client device 102, it is possible for the messaging client 104 to instead capture an image (e.g., a live video feed) from a rear-facing camera. In this regard, the camera selection button 606 corresponds to a user-selectable button for switching between the rear-facing and front-facing camera of the client device 102. The user interface 602 further includes a flash button 608 for activating or deactivating a flash with respect to the captured image 604.

As noted above, the augmented reality content item provides for a mesh that is configured to track facial regions. The augmented reality content item may or may not display a representation of the mesh (e.g., via overlays which outline the facial regions). In the example of FIGS. 6A-6C, the mesh is not displayed.

The user may select a particular region of the face (e.g., the lips), and the shopping system 214 may determine a range of available color and contrast values corresponding to the selected lip region. Moreover, the augmented reality content item provides for the display of the color selector 610 depicting the range of color values, and may further display the contrast selector 614 depicting the range of contrast values. The color selector 610 is displayed as a first vertical, arc-shaped bar at a left side of the device screen, and the contrast selector 614 is displayed as a second vertical, arc-shaped bar at a right side of the device screen.

In one or more embodiments, the user may select a color via the color selector 610 using touch input 612. The range of available contrast values depicted in the contrast selector 614 may adjust based on the selected color. In addition, the user may select a contrast via the contrast selector 614 using touch input 616. Based on the selected color and contrast, the augmented reality content item may present simulated makeup corresponding to the selected color/contrast values (e.g., associated with touch input 612 and touch input 616) at the selected facial region (e.g., lips).

The carousel interface 618 allows the user to cycle through and/or select different augmented reality content items to apply/display with respect to the captured image 604. Each of the available augmented reality content items is represented by an icon which is user-selectable for switching to the respective augmented reality content item. In one or more embodiments, the icon corresponding to an active augmented reality content item (e.g., the selected AR icon 620) is displayed in a different manner relative to (e.g., larger than) the remaining icons. User selection of the selected AR icon 620 provides for generating a media content item which includes an image (e.g., in response to a press/tap gesture of the selected AR icon 620) and/or a video (e.g., in response to a press-and-hold gesture of selected AR icon 620) of the screen content, for example, to send to friends, include in a Story, and the like.

FIG. 6B illustrates another example user interface 622 with interface elements for selecting makeup color and contrast, in accordance with some example embodiments. For example, the user interface 622 corresponds to an alternate embodiment of the augmented reality content item corresponding to the selected AR icon 620. Similar to FIG. 6A, the user interface 622 depicts the captured image 604, and includes the camera selection button 606, the flash button 608, and the carousel interface 618.S The user interface 622 further includes a color selector 624 which is configured to receive touch input 626 and perform functions similar to those of the color selector 610 of FIG. 6A. Moreover, the user interface 622 includes a contrast selector 628 which is configured to receive touch input 630 and perform functions similar to those of the contrast selector 614 of FIG. 6A. However, the color selector 624 and contrast selector 628 are displayed in a horizontal manner (as opposed to vertical in FIG. 6A), and at top and bottom parts (as opposed to left and right in FIG. 6A) of the device screen.

FIG. 6C illustrates another example user interface 632 with interface elements for selecting makeup color and contrast, in accordance with some example embodiments. For example, the user interface 622 corresponds to an alternate embodiment of the augmented reality content item corresponding to the selected AR icon 620. Similar to FIG. 6A, the user interface 622 depicts the captured image 604, and includes the camera selection button 606, the flash button 608, and the carousel interface 618.

The user may select a particular region of the face (e.g., the lips), and the shopping system 214 may determine a range of available color and contrast values corresponding to the selected lip region. Moreover, the augmented reality content item provides for the display of the color selector 634 depicting the range of color values, and further provides the contrast selector 636 for selection of contrast.

The color selector 634 is presented as a periphery of a circle, and includes the range of color values for user selection of a particular color. Moreover, the contrast selector 636 is depicted as an element (e.g., smaller circle) positioned at the center of the circle corresponding to the color selector 634. The user may select a contrast value based on a distance of touch input relative to the contrast selector 636 (e.g., with lower contrast for touch input at the periphery, and increasing contrast as the touch input approaches the contrast selector 636). The range of available contrast values may adjust based on the selected color. In one or more embodiments, the user may select both the color and contrast via a tap-and-drag gesture (e.g., with the tap portion for color section and the drag portion for contrast selection). Based on the selected color and contrast, the augmented reality content item may present simulated makeup corresponding to the selected color/contrast values (e.g., associated with touch input 612 and touch input 616) at the selected facial region (e.g., lips).

FIG. 7A illustrates an example user interface 702 in which a user provides touch input for changing makeup color, in accordance with some example embodiments. Similar to FIG. 6A, the user interface 702 depicts the captured image 604, and includes the camera selection button 606, the flash button 608, the carousel interface 618 and the selected AR icon 620.

The user interface 702 may be displayed in response to user input indicating to display a completed look with respect to selected color/contrast values for multiple regions of a depicted face. The user input may correspond to a predefined gesture and/or user selection of a dedicated button (not shown) to display the completed look. In a case where the user had selected multiple makeup products, the completed look corresponds with applying all of the selected color/contrast values with respect to the face depicted in the captured image 604. In response to the touch input 704 (e.g., corresponding to a press-and-hold gesture), the messaging client 104 displays a color selector 706 as discussed below with respect to FIG. 7B.

FIG. 7B illustrates the user interface 702 for changing makeup color in response to the touch input 704. In the example of FIG. 7B, the touch input 704 corresponds to the lip region of the face depicted in the captured image 604. In response to the touch input 704, the messaging client 104 (e.g., in conjunction with the augmented reality content item) displays the color selector 706, which depicts the range of colors available for the selection region (e.g., lips). The color selector 706 is configured to receive additional touch input 708 for user selection of a particular color within the range of colors presented by the color selector 706.

Figure 8:
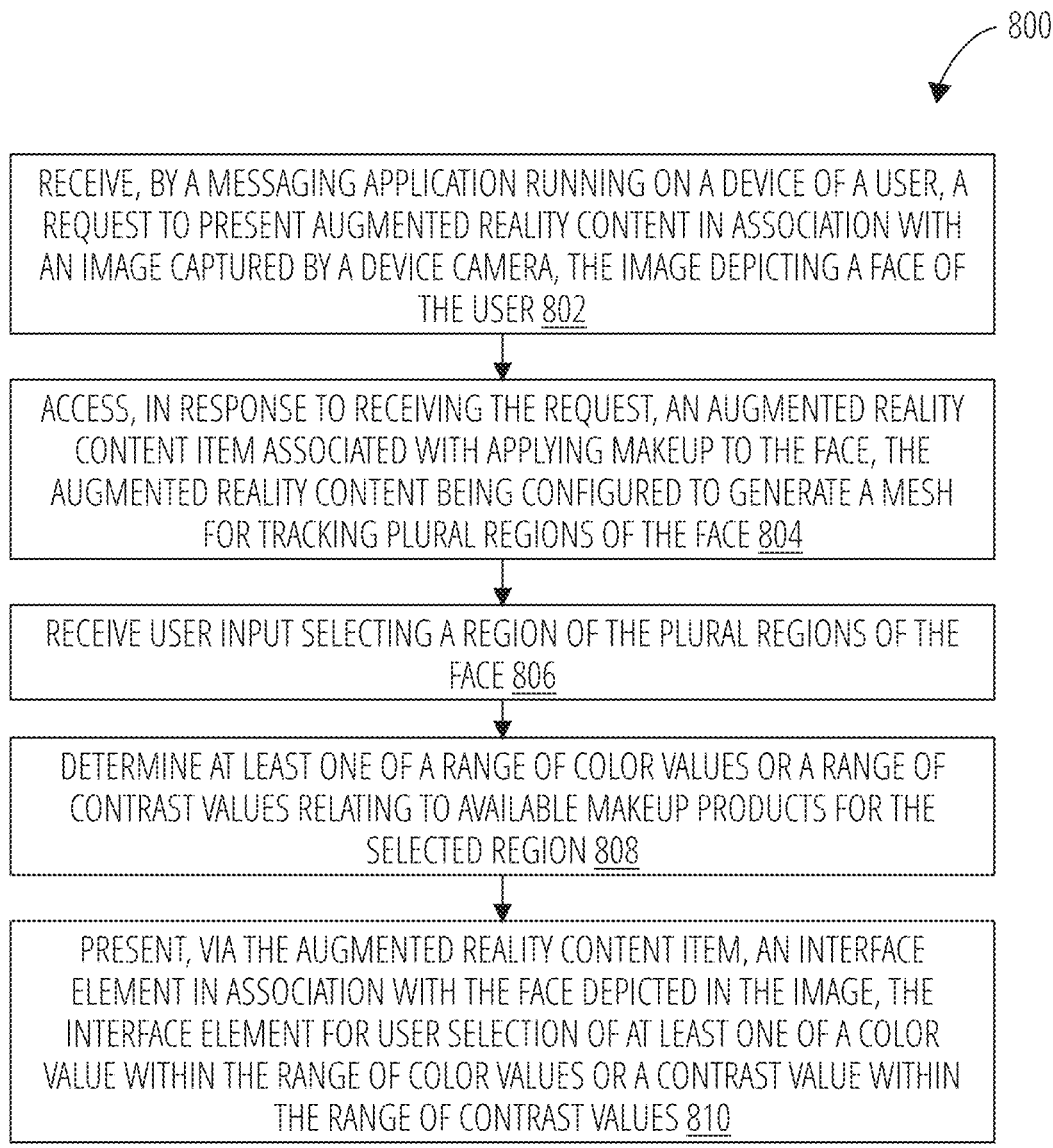
FIG. 8 is a flowchart illustrating a process for providing augmented reality-based makeup in a messaging system, in accordance with some example embodiments.

FIG. 8 is a flowchart illustrating a process 800 for providing augmented reality-based makeup in a messaging system, in accordance with some example embodiments. For explanatory purposes, the process 800 is primarily described herein with reference to the messaging client 104 of FIG. 1, the augmentation system 208 and the shopping system 214 of FIG. 2. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The messaging client 104 receives a request to present augmented reality content in association with an image captured by a device camera, the image depicting a face of the user (block 802). The messaging client 104 may display a carousel interface for selecting the augmented reality content item from among plural augmented reality content items, and receive, via the carousel interface, user selection of the augmented reality content item from among the plural augmented reality content items. The request may correspond to the user selection.

The messaging client 104 (e.g., in conjunction with the augmentation system 208) accesses, in response to receiving the request, an augmented reality content item associated with applying makeup to the face, the augmented reality content being configured to generate a mesh for tracking plural regions of the face (block 804). The messaging client 104 receives user input selecting a region of the plural regions of the face (block 806).

The messaging client 104 (e.g., in conjunction with the shopping system 214) determines at least one of a range of color values or a range of contrast values relating to available makeup products for the selected region (block 808). The messaging client 104 presents, via the augmented reality content item, an interface element in association with the face depicted in the image, the interface element for user selection of at least one of a color value within the range of color values or a contrast value within the range of contrast values (block 810).

The interface element may include a first selection bar which depicts the range of color values, the first selection bar being configured for user selection of the color value from among the range of color values. The interface element may further include a second selection bar which depicts the range of contrast values, the second selection bar being configured for user selection of the contrast value from among the range of contrast values. Each of the first and second selection bars may be arc-shaped.

Alternatively or in addition, the interface element may include a circle having a periphery depicting the range of color values, the periphery being configured for user selection of the color value from among the range of color values. User selection of the contrast value may be based on a distance of touch input relative to a center of the circle.

The messaging client 104 may receive second user input selecting at least one of the color value or the contrast value, and display, via the augmented reality content item, a makeup overlay corresponding to the at least one color value or contrast value with respect to the selected region of the face. The messaging client 104 (e.g., in conjunction with the shopping system 214) may determine at least one makeup product corresponding to the makeup overlay, and provide a second interface element for adding the at least one makeup product to a shopping cart associated with a user account of the user.

Figure 9:
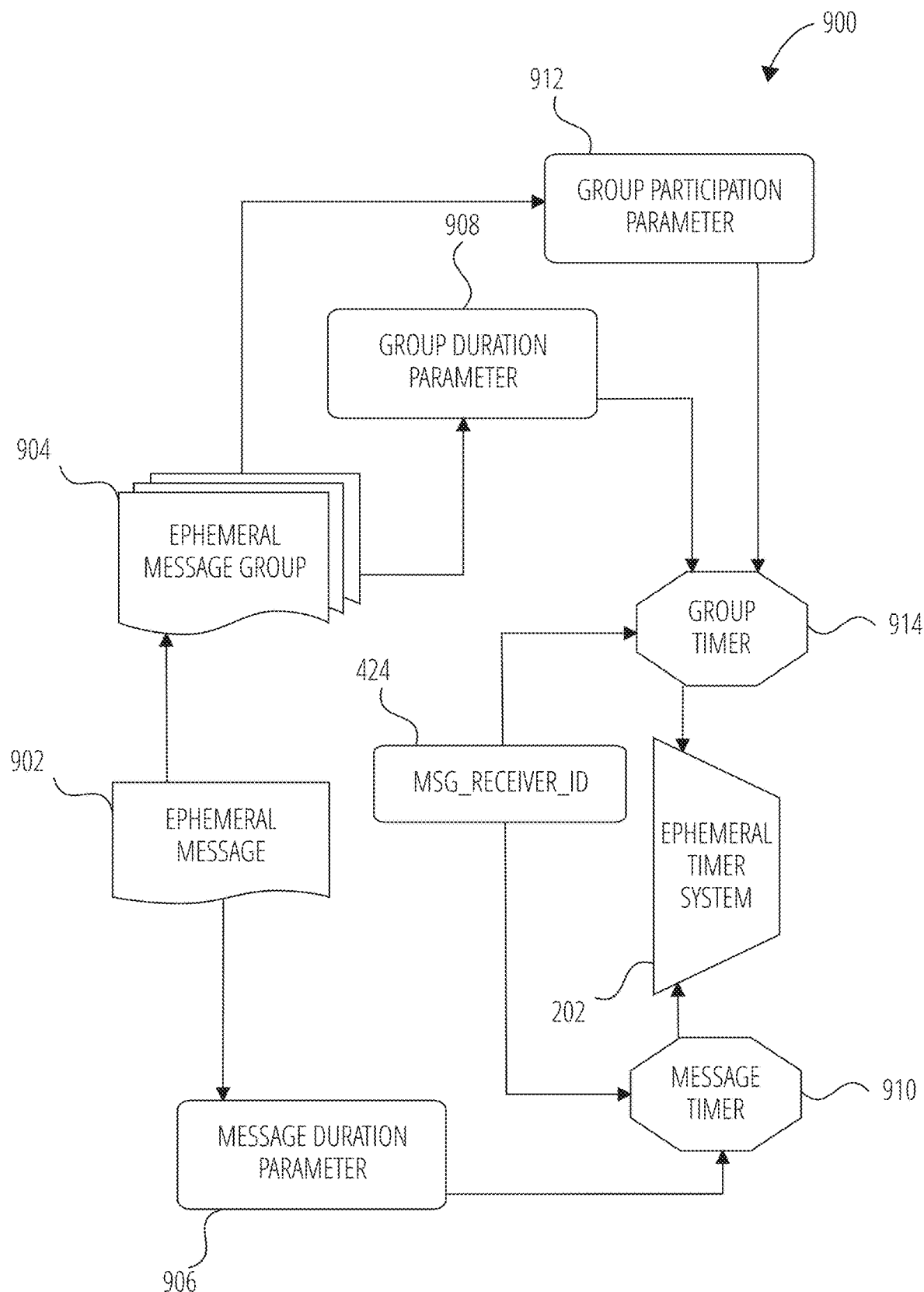
FIG. 9 is a flowchart for an access-limiting process, in accordance with some examples.

FIG. 9 is a schematic diagram illustrating an access-limiting process 900, in terms of which access to content (e.g., an ephemeral message 902, and associated multimedia payload of data) or a content collection (e.g., an ephemeral message group 904) may be time-limited (e.g., made ephemeral).

An ephemeral message 902 is shown to be associated with a message duration parameter 906, the value of which determines an amount of time that the ephemeral message 902 will be displayed to a receiving user of the ephemeral message 902 by the messaging client 104. In one example, an ephemeral message 902 is viewable by a receiving user for up to a maximum of 10 seconds, depending on the amount of time that the sending user specifies using the message duration parameter 906.

The message duration parameter 906 and the message receiver identifier 424 are shown to be inputs to a message timer 910, which is responsible for determining the amount of time that the ephemeral message 902 is shown to a particular receiving user identified by the message receiver identifier 424. In particular, the ephemeral message 902 will only be shown to the relevant receiving user for a time period determined by the value of the message duration parameter 906. The message timer 910 is shown to provide output to a more generalized ephemeral timer system 202, which is responsible for the overall timing of display of content (e.g., an ephemeral message 902) to a receiving user.

The ephemeral message 902 is shown in FIG. 9 to be included within an ephemeral message group 904 (e.g., a collection of messages in a personal story, or an event story). The ephemeral message group 904 has an associated group duration parameter 908, a value of which determines a time duration for which the ephemeral message group 904 is presented and accessible to users of the messaging system 100. The group duration parameter 908, for example, may be the duration of a music concert, where the ephemeral message group 904 is a collection of content pertaining to that concert. Alternatively, a user (either the owning user or a curator user) may specify the value for the group duration parameter 908 when performing the setup and creation of the ephemeral message group 904.

Additionally, each ephemeral message 902 within the ephemeral message group 904 has an associated group participation parameter 912, a value of which determines the duration of time for which the ephemeral message 902 will be accessible within the context of the ephemeral message group 904. Accordingly, a particular ephemeral message group 904 may "expire" and become inaccessible within the context of the ephemeral message group 904, prior to the ephemeral message group 904 itself expiring in terms of the group duration parameter 908. The group duration parameter 908, group participation parameter 912, and message receiver identifier 424 each provide input to a group timer 914, which operationally determines, firstly, whether a particular ephemeral message 902 of the ephemeral message group 904 will be displayed to a particular receiving user and, if so, for how long. Note that the ephemeral message group 904 is also aware of the identity of the particular receiving user as a result of the message receiver identifier 424.

Accordingly, the group timer 914 operationally controls the overall lifespan of an associated ephemeral message group 904, as well as an individual ephemeral message 902 included in the ephemeral message group 904. In one example, each and every ephemeral message 902 within the ephemeral message group 904 remains viewable and accessible for a time period specified by the group duration parameter 908. In a further example, a certain ephemeral message 902 may expire, within the context of ephemeral message group 904, based on a group participation parameter 912. Note that a message duration parameter 906 may still determine the duration of time for which a particular ephemeral message 902 is displayed to a receiving user, even within the context of the ephemeral message group 904. Accordingly, the message duration parameter 906 determines the duration of time that a particular ephemeral message 902 is displayed to a receiving user, regardless of whether the receiving user is viewing that ephemeral message 902 inside or outside the context of an ephemeral message group 904.

The ephemeral timer system 202 may furthermore operationally remove a particular ephemeral message 902 from the ephemeral message group 904 based on a determination that it has exceeded an associated group participation parameter 912. For example, when a sending user has established a group participation parameter 912 of 24 hours from posting, the ephemeral timer system 202 will remove the relevant ephemeral message 902 from the ephemeral message group 904 after the specified 24 hours. The ephemeral timer system 202 also operates to remove an ephemeral message group 904 when either the group participation parameter 912 for each and every ephemeral message 902 within the ephemeral message group 904 has expired, or when the ephemeral message group 904 itself has expired in terms of the group duration parameter 908.

In certain use cases, a creator of a particular ephemeral message group 904 may specify an indefinite group duration parameter 908. In this case, the expiration of the group participation parameter 912 for the last remaining ephemeral message 902 within the ephemeral message group 904 will determine when the ephemeral message group 904 itself expires. In this case, a new ephemeral message 902, added to the ephemeral message group 904, with a new group participation parameter 912, effectively extends the life of an ephemeral message group 904 to equal the value of the group participation parameter 912.

Responsive to the ephemeral timer system 202 determining that an ephemeral message group 904 has expired (e.g., is no longer accessible), the ephemeral timer system 202 communicates with the messaging system 100 (and, for example, specifically the messaging client 104) to cause an indicium (e.g., an icon) associated with the relevant ephemeral message group 904 to no longer be displayed within a user interface of the messaging client 104. Similarly, when the ephemeral timer system 202 determines that the message duration parameter 906 for a particular ephemeral message 902 has expired, the ephemeral timer system 202 causes the messaging client 104 to no longer display an indicium (e.g., an icon or textual identification) associated with the ephemeral message 902.

Figure 10:
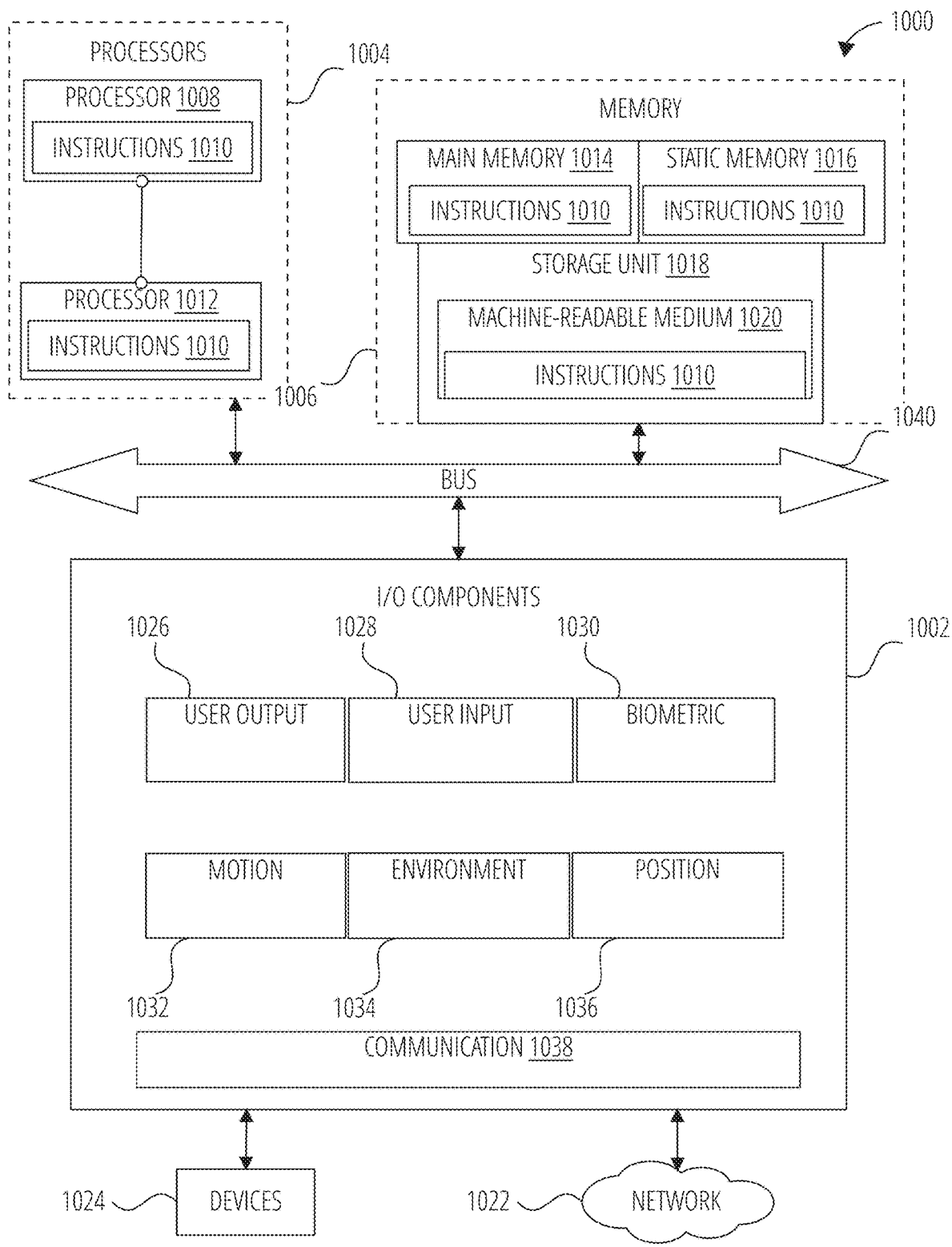
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1010 (e.g., software, a program, an application, an applet, an app, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1002, which may be configured to communicate with each other via a bus 1040. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the Processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface Component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Figure 11:
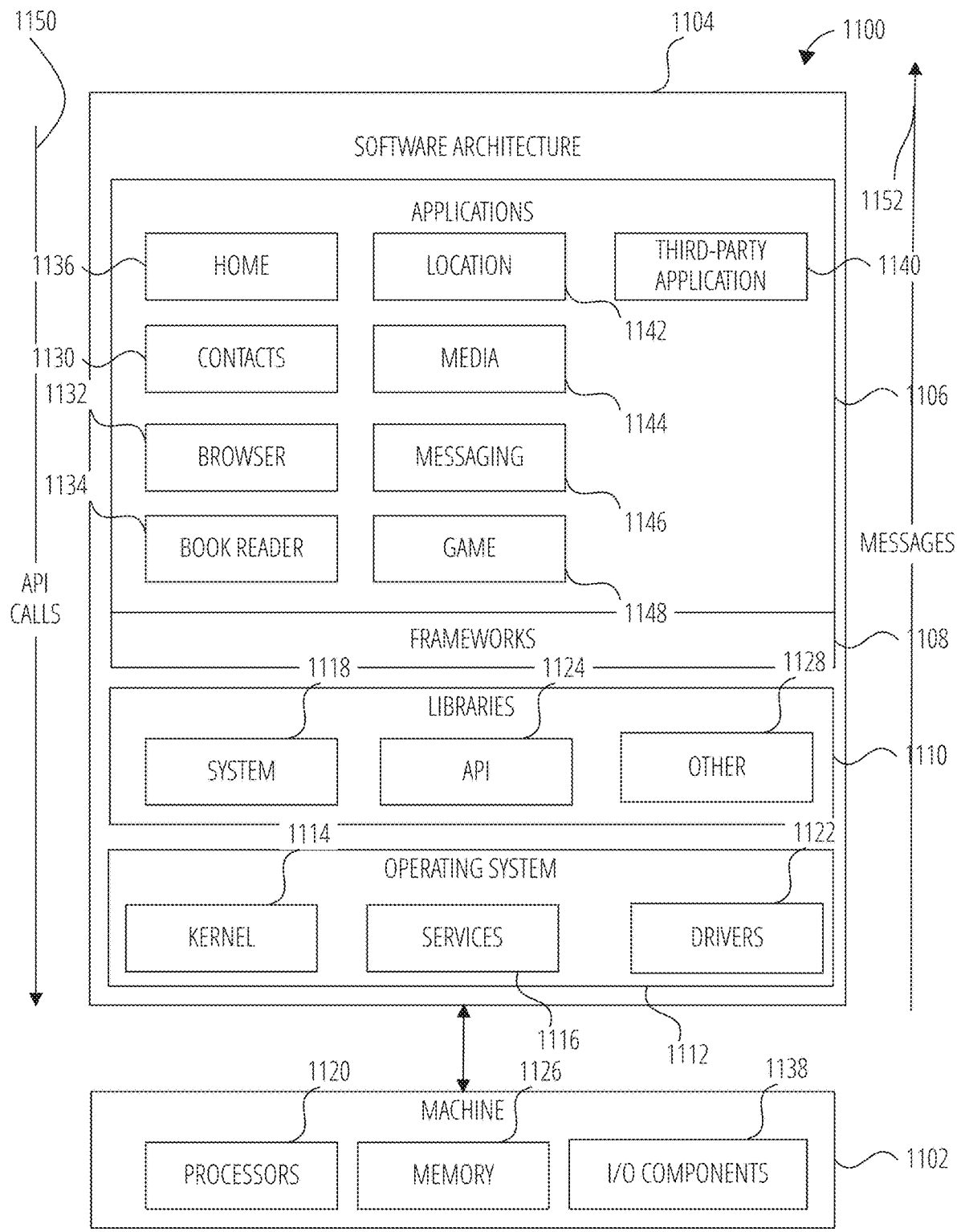
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
receiving, by a messaging application running on a device of a user, a request to present augmented reality content in association with an image captured by a device camera, the image depicting a face of the user;
accessing, in response to receiving the request, an augmented reality content item associated with applying makeup to the face, the augmented reality content being configured to generate a mesh for tracking plural regions of the face;
receiving user input selecting a region of the plural regions of the face;
determining a range of color values and a range of contrast values relating to available makeup products for the selected region; and
presenting, via the augmented reality content item, an interface element in association with the face depicted in the image, the interface element for user selection of a color value within the range of color values and a contrast value within the range of contrast values,
wherein the interface element comprises a first circle having a periphery depicting the range of color values, the periphery providing for user selection of the color value via a first gesture, and
wherein the interface element further comprises a second circle which is smaller than the first circle and positioned within the first circle, the second circle providing for user selection of the contrast value via a second gesture.

2. The method of claim 1, further comprising:
receiving second user input selecting at least one of the color value or the contrast value; and
displaying, via the augmented reality content item, a makeup overlay corresponding to the at least one color value or the contrast value with respect to the selected region of the face.

3. The method of claim 2, further comprising:
determining at least one makeup product corresponding to the makeup overlay; and
providing a second interface element for adding the at least one makeup product to a shopping cart associated with a user account of the user.

4. The method of claim 1, further comprising:
displaying, by the messaging application, a carousel interface for selecting the augmented reality content item from among plural augmented reality content items; and
receiving, via the carousel interface, user selection of the augmented reality content item from among the plural augmented reality content items,
wherein the request corresponds to the user selection.

5. A device comprising:
at least one processor; and
a memory storing instructions that, when executed by the processor, configure the processor to perform operations comprising:
receiving, by a messaging application running on the device of a user, a request to present augmented reality content in association with an image captured by a device camera, the image depicting a face of the user;
accessing, in response to receiving the request, an augmented reality content item associated with applying makeup to the face, the augmented reality content being configured to generate a mesh for tracking plural regions of the face;
receiving user input selecting a region of the plural regions of the face;
determining a range of color values and a range of contrast values relating to available makeup products for the selected region; and
presenting, via the augmented reality content item, an interface element in association with the face depicted in the image, the interface element for user selection of a color value within the range of color values and a contrast value within the range of contrast values,
wherein the interface element comprises a first circle having a periphery depicting the range of color values, the periphery providing for user selection of the color value via a first gesture, and
wherein the interface element further comprises a second circle which is smaller than the first circle and positioned within the first circle, the second circle providing for user selection of the contrast value via a second gesture.

6. The device of claim 5, the operations further comprising:
receiving second user input selecting at least one of the color value or the contrast value; and
displaying, via the augmented reality content item, a makeup overlay corresponding to the at least one color value or the contrast value with respect to the selected region of the face.

7. The device of claim 6, the operations further comprising:
determining at least one makeup product corresponding to the makeup overlay; and
providing a second interface element for adding the at least one makeup product to a shopping cart associated with a user account of the user.

8. The device of claim 5, the operations further comprising:
displaying, by the messaging application, a carousel interface for selecting the augmented reality content item from among plural augmented reality content items; and
receiving, via the carousel interface, user selection of the augmented reality content item from among the plural augmented reality content items,
wherein the request corresponds to the user selection.

9. A non-transitory computer-readable storage medium, the computer-readable storage medium including instructions that when executed by a computer, cause the computer to perform operations comprising:
- receiving, by a messaging application running on a device of a user, a request to present augmented reality content in association with an image captured by a device camera, the image depicting a face of the user;
- accessing, in response to receiving the request, an augmented reality content item associated with applying makeup to the face, the augmented reality content being configured to generate a mesh for tracking plural regions of the face;
- receiving user input selecting a region of the plural regions of the face;
- determining a range of color values and a range of contrast values relating to available makeup products for the selected region; and
- presenting, via the augmented reality content item, an interface element in association with the face depicted in the image, the interface element for user selection of a color value within the range of color values and a contrast value within the range of contrast values,
- wherein the interface element comprises a first circle having a periphery depicting the range of color values, the periphery providing for user selection of the color value via a first gesture, and
- wherein the interface element further comprises a second circle which is smaller than the first circle and positioned within the first circle, the second circle providing for user selection of the contrast value via a second gesture.

10. The non-transitory computer-readable storage medium of claim 9, the operations further comprising:
- receiving second user input selecting at least one of the color value or the contrast value; and
- displaying, via the augmented reality content item, a makeup overlay corresponding to the at least one color value or the contrast value with respect to the selected region of the face.

11. The non-transitory computer-readable storage medium of claim 10, the operations further comprising:
- determining at least one makeup product corresponding to the makeup overlay; and
- providing a second interface element for adding the at least one makeup product to a shopping cart associated with a user account of the user.

* * * * *